United States Patent [19]
Babitchenko

[11] Patent Number: 5,345,692
[45] Date of Patent: Sep. 13, 1994

[54] ACCESSORIES FOR OUTSIDE MICROMETERS AND CALIPERS

[76] Inventor: Rafail N. Babitchenko, 10537 Dempsey Ave., Granada Hills, Calif. 91344

[21] Appl. No.: 997,328

[22] Filed: Dec. 28, 1992

[51] Int. Cl.$^5$ .............................................. G01B 5/02
[52] U.S. Cl. ........................................ 33/828; 33/826
[58] Field of Search ................. 33/828, 811, 812, 821, 33/826, 831, 784

[56] References Cited

U.S. PATENT DOCUMENTS

| | | | |
|---|---|---|---|
| 1,646,393 | 10/1927 | De La Mater | 33/828 |
| 2,193,939 | 3/1940 | Sanford | 33/821 |
| 2,607,999 | 8/1952 | Stedman | 33/828 |
| 3,496,758 | 2/1970 | Sunnen | 33/828 |
| 4,077,129 | 3/1978 | Nishikata | 33/784 |
| 4,399,613 | 8/1983 | Nishikata et al. | 33/784 |

FOREIGN PATENT DOCUMENTS

| | | | |
|---|---|---|---|
| 276213 | 7/1914 | Fed. Rep. of Germany | 33/828 |
| 174481 | 4/1953 | Fed. Rep. of Germany | 33/559 |
| 289299 | 4/1928 | United Kingdom | 33/559 |

*Primary Examiner*—Christopher W. Fulton
*Attorney, Agent, or Firm*—Allan M. Shapiro

[57] ABSTRACT

Extension standards are provided for outside micrometers and calipers. Sleeves engage the extension standards and the micrometer anvil and/or spindle, or the measuring surfaces of calipers, to selectably position the measuring gap and also to provide different sizes of such measuring gaps at those positions.

28 Claims, 2 Drawing Sheets

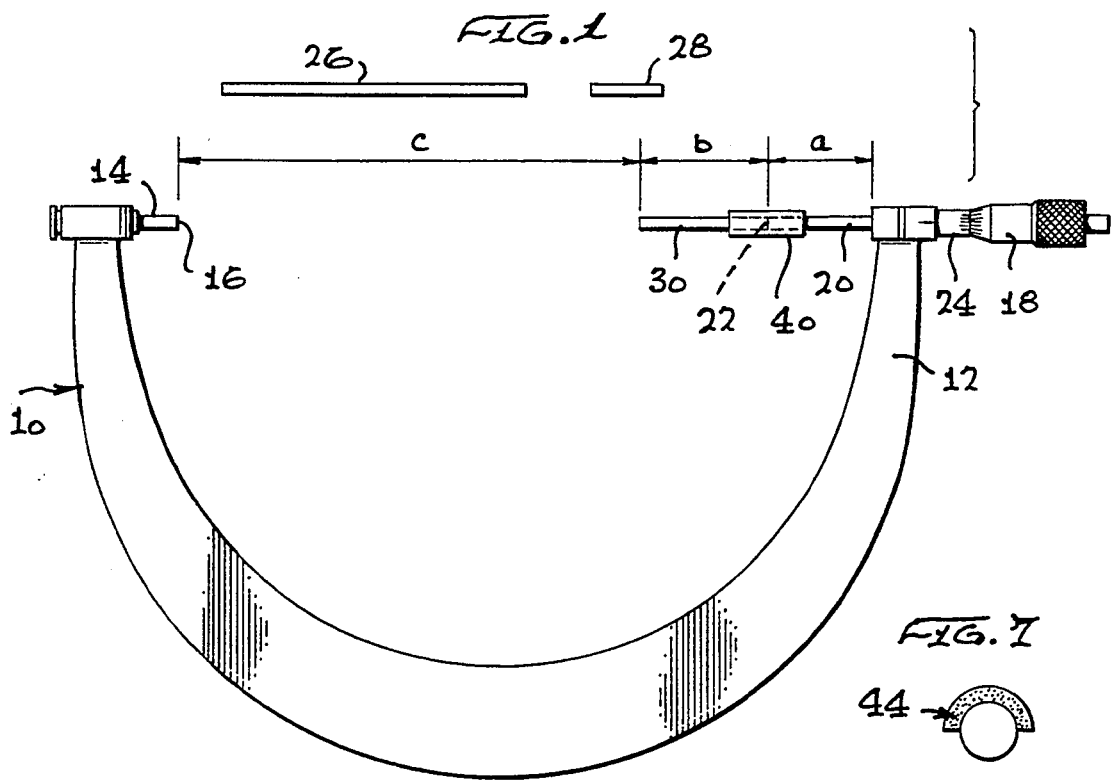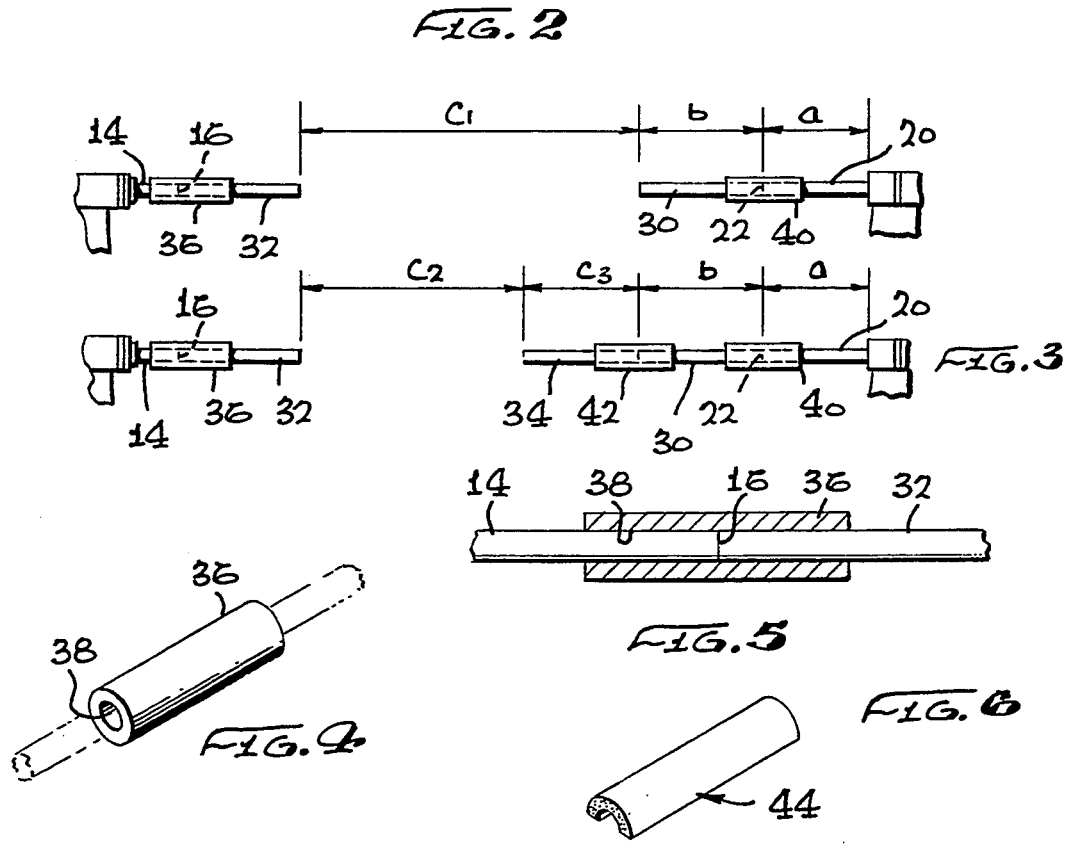

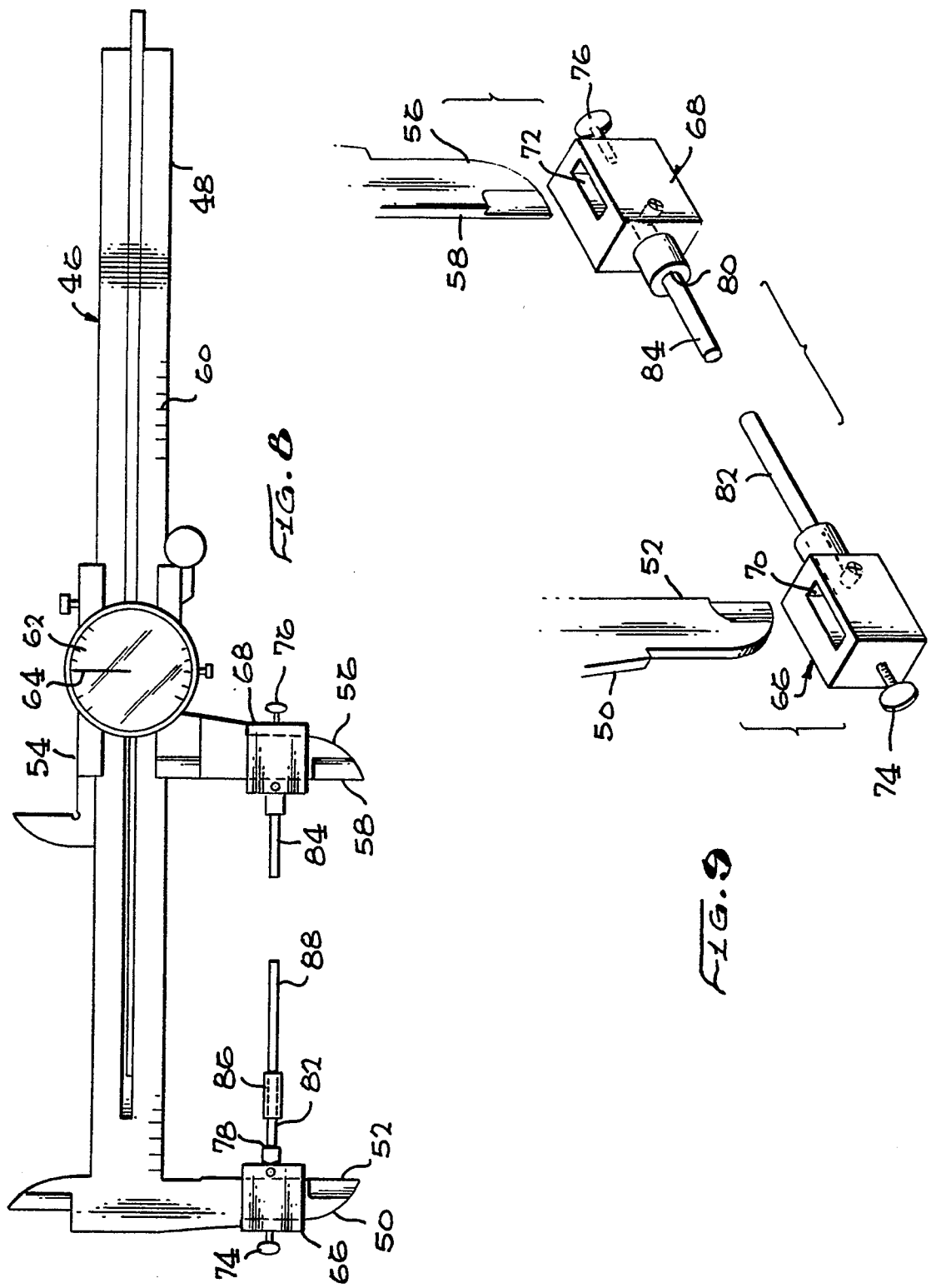

ACCESSORIES FOR OUTSIDE MICROMETERS AND CALIPERS

FIELD OF THE INVENTION

This invention is directed to accessories for outside micrometers and calipers which attach to the anvil and/or moving part of a measuring device to reduce and/or position the measuring gap without requiring recalibration of the measuring device.

BACKGROUND OF THE INVENTION

The well-known bow micrometer has a fixed anvil and a threaded spindle facing the anvil. The space between the face of the spindle and the face of the anvil is the measuring gap. The threaded spindle has 40 threads per inch so that each rotation represents 0.025 inch of measurement. The barrel around the spindle is calibrated to permit readout of measurements. Since many turns (40 turns) are required of the spindle to move it an inch, micrometers are provided in different measuring gap ranges. Furthermore, in order to reduce the number of micrometers and calipers needed for a full measurement range, they are provided with interchangeable anvils of different lengths.

Another problem arising from the use of interchangeable anvils is the fact that the measuring gap is always close to the spindle and to the micrometer bow. Sometimes the structure which is to be measured does not permit access in that way. For example, when a web is measured underneath a flange, it is desirable to be able to select the position of the measuring gap. Also, there are other configurations, such as pockets and steps, where it is desirable to check the thickness of all kinds of walls or the distance or depth of a variety of surfaces from the main surface. Thus, it is desirable to provide accessories which permit outside micrometers and calipers to have different sizes of selectable measuring gaps at a desired location between the anvil and spindle of the micrometer or measuring surfaces of the calipers.

SUMMARY OF THE INVENTION

In order to aid in the understanding of this invention, it can be stated in essentially summary form that it is directed to accessories for outside micrometers and calipers wherein an extension standard is placed against either or both the anvil and spindle of an outside micrometer or measuring surfaces of the caliper so that the possibilities for use of conventional micrometers and calipers are greatly increased by permitting selection of and changes in both the location and also the size of the measuring ranges.

It is, thus, an object and advantage of this invention to provide accessories for outside micrometers and calipers whereby micrometer calibrating standards are used as extensions in association with sleeves which hold the extension standards on the micrometer anvil or spindle, or on the caliper measuring surfaces.

It is a further object and advantage of this invention to provide accessories for outside micrometers and calipers whereby standards can be used as extensions and the extension standards can be applied either to the anvil or spindle or both of a micrometer or the measuring surfaces of the caliper in order to select the size and position of the measuring gap.

It is another object and advantage of this invention to provide sleeves configured to support standards as extensions on the caliper arms of sliding calipers, with these sleeves appearing in the form of a clamp which can engage over one or both of the arms of the sliding caliper to also position the measuring gap in a desired location.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a side-elevational view of an outside micrometer of bow configuration, showing a sleeve and several standards which can alternatively be used as extensions.

FIG. 2 illustrates the manner in which several sleeves and extension standards are used to position the measuring gap in the micrometer of FIG. 1.

FIG. 3 is similar to FIG. 2, showing a different utilization of standards and sleeves to define the size and position of the micrometer measuring gap.

FIG. 4 is an isometric view of a tubular sleeve.

FIG. 5 is a section through a sleeve of the type shown in FIG. 4, when it is employed with two standards.

FIG. 6 is an isometric view of an alternative, magnetic sleeve.

FIG. 7 is an end view of the sleeve of FIG. 6 in use with a standard used as an extension.

FIG. 8 is a side-elevational view of a sliding caliper rule employing a second preferred embodiment of the accessories in accordance with this invention.

FIG. 9 is an isometric view of the accessories of FIG. 8, with part of the sliding caliper broken away.

DESCRIPTION OF THE PREFERRED EMBODIMENTS

A bow micrometer suitable for use with the accessories of this invention is generally indicated at 10 in FIG. 1. The bow micrometer 10 has a frame 12 which is of C-shape so as to provide an open center. The frame is configured for a balance between rigidity and lightness. Anvil 14 is secured to frame 12 at the left end of its arc, as seen in FIG. 1. The anvil 14 is conventionally removable in micrometer 10 of this size and is replaceable by anvils of different lengths. The anvil is conventionally adjustable in its seat in the frame so as to provide a zero measurement reference. The anvil has a face 16 which provides a measuring reference surface.

The other end of the frame 12 carries a body 24 with a threaded opening therethrough. Micrometer thimble 18 surrounds the body. Spindle 20 is mounted on the thimble and is threaded through the body and extends into the opening of the bow. Spindle 20 has a measuring face 22 thereon. The anvil 14 and spindle 20 are each circular rods lying on the same axis. Their measuring faces face each other. It is the distance between these faces which is indicated by the thimble with reference to the micrometer body 24. Parts to be measured are placed between the anvil face and the spindle measuring face. Rotation of the thimble brings the faces to the part being measured, and the reference position of the thimble with respect to the micrometer body 24 indicates measurement. The anvil 14 may be replaced with a different length of anvil to place the anvil face 16 at an appropriate distance from the spindle measuring face 22 to measure the particular part. In order to calibrate the micrometer when an anvil change is made, measuring standards are provided.

Measuring standards 26, 28 and 30 are shown in FIG. 1. Additional measuring standards 32 and 34 are shown in FIG. 3. The additional measuring standards 32 and 34 are illustrated as being, for example, the same length as standard 30. Each of these measuring standards has a measuring face thereon, and the distance between the faces is known. In the preferred example shown in FIG. 1, the measuring standard 28 is the smallest, with the measuring standard 30 twice as long and the measuring standard 26 twice as long as the standard 30. Standards 30, 32 and 34 are the same length.

Sleeve 36 is shown in FIG. 4. Sleeve 36 is a right circular cylindrical tube. Its interior opening 38 is sized to receive either the anvil 14, the spindle 20, or one of the measuring standards therein. The size is for a slip fit so that, when assembled, the sleeve releasably retains the anvil, spindle or standard therein. Each is a cylindrical rod of the same size so that the sleeve 36 can mount a measuring standard to either the anvil or spindle. As shown in FIGS. 2, 3 and 5, the sleeve 36 is mounted on anvil 14 and measuring standard 32 is also mounted therein. The measuring standard is mounted in face-to-face relationship with the measuring face of the anvil, as seen in FIG. 5. Sleeves 40 and 42 are identical to sleeve 36. The sleeves are used in attaching selected ones of the standards to the anvil and spindle, as required.

As seen in FIGS. 1, 2 and 3, the spindle has a measuring range indicated by the letter a. If the dimension to be measured is in the range between b+c, then the micrometer 10 can be used without the accessories of this invention. However, when the range of the device to be measured is between c and a+c, then the measuring standard 30 is mounted on the spindle 20 by means of sleeve 40, as seen in FIGS. 1 and 2. Now the measuring range is between c and a+c. This is less than the previous measuring range by the distance b. Different ones of the measuring standards 26, 28 and 30 can be placed in the sleeve 40 to provide different lengths of the measuring gap. Two extension measuring standards can be placed on the spindle, if desired. As seen in FIG. 3, sleeve 40 carries extension measuring standard 30 in face-to-face relationship on the end of the micrometer spindle 20, and sleeve 42 carries extension 34 in face-to-face relationship with the measuring standard 30 to differently define the measuring gap.

When it is used in such a way, the measuring gap is always close to the anvil end of the frame, as compared to the positioning of the measuring gap at the spindle when anvils of greater length are used. The placement of the measuring gap at the anvil end of the frame permits the micrometer 10 to measure in places where the anvil must be thrust laterally into an opening. Another manner of use of the sleeves in conjunction with the measuring standard is by placement of a sleeve on the anvil and placing a measuring standard therein. This is illustrated in FIGS. 2 and 3 where the sleeve 36 is installed on the anvil 14 and the measuring standard 32 is inserted and held therein in face-to-face relationship to the anvil. This creates a measuring gap farther away from the anvil and more centered in the bow of the micrometer. This permits measurement of webs under flanges, for example. The location of the measuring gap can be positioned as required for the particular measurement. By placement of one or more sleeves, either on the anvil end or spindle end, in association with measuring standards of different lengths, the desired measuring gap at the desired position between the anvil and spindle can be selected.

The sleeves 36, 40 and 42 are simple tubes which receive and hold the measuring standards in a sliding fit. An alternative structure is sleeve 44, shown in FIGS. 6 and 7. The sleeve 44 is a tube of the same size as the tube of sleeve 36, but it is divided on a central axial plane, and the material of the sleeve 44 is magnetic. Since the anvil, spindle and measuring standards are of steel, the sleeve 44 holds the measuring standards in the selected position by magnetic force. The positioning of the sleeves and the measuring standards is the same as with respect to FIGS. 1, 2 and 3 to position the measuring gap at the right location and of the proper size.

In another preferred embodiment of this invention, measuring standards can also be used in association with a sliding caliper rule such as the caliper 46 illustrated in FIG. 8. The caliper 46 has a body 48 of generally rectangular configuration throughout most of its length. The body carries fixed finger 50 thereon, which has a measuring surface 52. Slider 54 is sized to embrace and be in sliding relationship with the body 48. Slider 54 carries moving finger 56 thereon, which has a measuring surface 58 facing the measuring surface 52. In this type of caliper, there are two indicators as to the distance between the measuring surfaces. Indicia 60 are marked along the length of the body to indicate the spacing between the measuring surface in inches and hundredths, for example. In addition, dial 62 has a hand 64 which is driven by the positioning of the slider on the body. The hand is an analog signal of the spacing. The dial 62 is generally calibrated in sufficiently small increments such as thousandths of an inch so that the caliper 46 is also a micrometer caliper. A structure is measured by placing it between the fingers and moving the measuring surfaces thereagainst. The indicia 60 and dial 62 are read in conjunction with each other to provide the indicated size. It can be seen from the structure of the caliper 46 that it cannot measure a web beneath a flange. The fingers cannot embrace around a flange and be closer at the tips to measure the web.

The clamps 66 and 68 are identical and are used to position measuring standards so that webs can be measured. They respectively have recesses 70 and 72 to respectively receive the fingers 50 and 56. Thumb screws 74 and 76 respectively hold the clamps in this position. Openings 78 and 80 in the clamps face each other and are open through to the measuring surfaces of the fingers. These openings are sized to receive measuring standards. Measuring standards 82 and 84 are respectively positioned within these openings. The openings are sufficiently close so as to releasably slidably hold the measuring standards in place. When they are in place, their outer ends are against the measuring surfaces 52 and 58. Thus, the measuring gap between the closer ends of the measuring standards is equal to the gap between the fingers minus the two measuring standards. In this way, the measuring gap can be positioned where desired. When longer measuring standards are required in order to position the measuring gap where needed, a sleeve like the sleeve 36 can be employed. Sleeve 86, seen in FIG. 8, may be identical to sleeve 36. Measuring standard 88 is inserted in the sleeve 86, in face-to-face relationship with the measuring standard 82, to place the measuring gap where desired. Different sizes of measuring standards can be placed as required to make a particular measurement. The clamps can be removed when it is desired that the micrometer caliper 46 be used in its conventional way.

It may be noted that the inventive accessories described in connection with FIG. 1 and associated drawings preferably have circular or cylindrical cross-sections, primarily because of the conventional cylindrical configuration of the anvil and micrometer spindle. In the case of the calipers of FIGS. 9 and 10, however, the mounting accessories are new and, thus, can have any sectional configuration desired such as, for example, square, rectangular or triangular. Furthermore, the illustrated and described caliper rule with a dial indicator can be a vernier rule instead, and the inside measuring fingers can be adapted for accessories in the same manner as the described outside measuring fingers.

Thus, in partial summary, it can be seen that this invention expands the capability of the conventional outside micrometers and calipers so they can measure from zero inch to whatever the maximum may be of that micrometer or calipers. For example, a conventional micrometer for measuring from the 9" to 10" range now can measure from 0" to 10" at any position within the measurement range.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An accessory for outside micrometer calipers, comprising:
   a measuring standard having first and second spaced faces, said first and second spaced faces being spaced from each other a known distance, said measuring standard having a uniform external surface in a direction at right angles to said spaced faces; and
   a sleeve, said sleeve having a surface sized to engage upon said external surface of said measuring standard so that said measuring standard is slidable with respect to said sleeve in a direction at a right angle to said faces so that said measuring standard can engage against a measuring surface of a micrometer or caliper by sliding of said measuring standard in said sleeve to reduce the measuring gap by a distance equal to the length of the measuring standard and position the measuring gap that distance away from the measuring surface whereby said measuring standard can be inserted in said sleeve at the location where the measurement is to be made without adjustment so that accurate adjustments can be made at remote locations away from measuring references.

2. The accessory of claim 1 wherein said measuring standard is in the form of a right circular cylinder and said sleeve has a concave curved surface sized to engage on the outside of said measuring standard and slide with respect to said measuring standard so that said measuring standard engages against the measuring surface of a bow micrometer or caliper for accurate assembly and measurement at a remote location.

3. The accessory of claim 2 wherein said sleeve is a half cylindrical tube made of magnetic material.

4. The accessory of claim 2 wherein said sleeve is a cylindrical tube sized to receive said measuring standard therein.

5. The accessory of claim 4 wherein said tube is sized to receive the anvil of a bow micrometer or caliper.

6. The accessory of claim 5 wherein there are first and second of said sleeves, said first sleeve being for receiving the anvil of the bow micrometer and said second sleeve being for receiving the spindle of the bow micrometer and said first and second sleeves each further respectively receiving first and second of said measuring standards, with said first measuring standard positioned in face-to-face contact with said anvil and said second measuring standard being positioned in face-to-face contact with said spindle so that the measuring gap between the anvil and spindle of the bow micrometer is reduced by the length of both said first and second measuring standards and is positioned at a selected location between the anvil and spindle.

7. The accessory of claim 1 wherein there are first and second of said sleeves, said first sleeve being for receiving the anvil of the bow micrometer and said second sleeve being for receiving the spindle of the micrometer and said first and second sleeves each further respectively receiving first and second of said measuring standards, with said first measuring standard positioned in face-to-face contact with said anvil and said second measuring standard being positioned in face-to-face contact with the spindle so that the measuring gap between the anvil and spindle of the bow micrometer is reduced by the length of both said first and second measuring standards and is positioned at a selected location between the anvil and spindle.

8. An outside micrometer caliper with accessories, comprising:
   a micrometer having a C-shaped frame, an anvil fixedly mounted on said frame and a spindle movably mounted on said frame, said anvil and said spindle being cylindrical and lying on the same axis, said anvil and said spindle each having a measuring face facing each other so that measurement may be made therebetween by movement of said spindle;
   a sleeve sized to engage upon said anvil;
   a measuring standard of known length slidably held by said sleeve in face-to-face contact with said anvil measuring surface so that said measuring standard can slide in said sleeve to firmly engage said measuring face on said anvil so as to reduce the measuring gap and position the measuring gap away from said anvil by said known length of said measuring standard that said measuring standard can be inserted in said sleeve so against said measuring face of said anvil at a measuring location without need for adjustment and provide accurate measurement.

9. The outside micrometer of claim 8 wherein said sleeve is magnetic and magnetically engages said anvil and said measuring standard.

10. The outside micrometer of claim 8 wherein said sleeve is tubular and has an interior opening therethrough to receive said measuring standard in face-to-face contact with said measuring face of said anvil.

11. The outside micrometer of claim 8 wherein said measuring standards comprise a plurality of measuring standards of different lengths.

12. An outside caliper with accessories, comprising:
   a caliper having a first measuring surface in a fixed position and a second measuring surface which is movable with respect to said first measuring surface and means connected thereto for indicating the distance between said first and second measuring surfaces;

a first measuring standard having opposite faces thereon of known distance therebetween; and mounting means for slidably retaining one surface of said measuring standard so that said measuring standard can slide inside said mounting means so that it can be placed in said mounting means at the measuring location and lie against one of said measuring surfaces so as to create a measuring gap between said measuring standard and the other measuring surface so that the measuring gap can be selected in both size and position at the measuring location without further adjustment.

13. The caliper and accessory of claim 12 wherein said mounting means includes a sleeve for engaging around said measuring standard.

14. The caliper and accessory of claim 12 wherein said mounting means for holding said measuring standard comprises a clamp for engaging the finger of said caliper and for slidably receiving a portion of said measuring standard.

15. The caliper and accessory of claim 12 wherein said mounting means for retaining said measuring standard comprises first and second clamps respectively for engaging on the fixed and moving surfaces of said micrometer caliper, each of said clamps having an opening therethrough and each of said openings having a measuring standard slidably carried therein in engagement with said respective measuring surface so that the position and size of the measuring gap between said measuring standards can be both positioned and selected, 16. The caliper and accessories of claim 15 further including a tubular sleeve engaging on one of said measuring standards and a further measuring standard slidably engaged in said tubular sleeve to reduce the measuring gap between said measuring standards and position the measuring gap with respect to said measuring surfaces on said calipers.

17. The caliper and accessories of claim 15 wherein said clamps are releasably secured on said measuring surfaces.

18. The caliper and accessories of claim 15 further including a measuring dial connected between said measuring surfaces for indicating the length of the measuring gap therebetween.

19. An accessory for outside micrometers and calipers, comprising:

first and second measuring standards, each of a length selected from a group of measuring standards having a plurality of lengths; and first and second sleeves, said sleeves each having a surface sized to engage upon and retain said measuring standard so that each said measuring standard can engage against a measuring surface of a bow micrometer or caliper to reduce the measuring gap between said measuring surfaces by a distance equal to the total length of the measuring standards and position the measuring gap a distance away from both the measuring surfaces.

20. The accessory of claim 19 wherein said measuring standard is in the form of a right circular cylinder and said sleeve has a concave curved surface sized to engage on the outside of said measuring standard.

21. An accessory for outside micrometers and calipers, comprising:

a measuring standard in the form of a right circular cylinder; and a sleeve having a concave surface sized to engage on the outside of said measuring standard, said sleeve being a half cylindrical tube made of magnetic material, so that said measuring standard can engage against a measuring surface of a bow micrometer or caliper to reduce the measuring gap by a distance equal to the length of the measuring standard and position the measuring gap that distance away from the measuring surface.

22. An outside micrometer caliper with accessories, comprising:

a micrometer having a C-shaped frame, an anvil fixedly mounted on said frame and a spindle movably mounted on said frame, said anvil and said spindle being cylindrical and lying on the same axis, said anvil and said spindle each having a measuring face facing each other so that measurement may be made therebetween by movement of said spindle;

a first sleeve sized to engage upon said anvil;

a second sleeve sized to fit on said spindle;

a first measuring standard of known length held by said first sleeve in face-to-face contact with said anvil measuring surface so as to reduce the measuring gap and position the measuring gap away from said anvil by said known length of said first measuring standard; and a second measuring standard of known length held by said second sleeve in face-to-face contact with said spindle measuring surface so as to reduce the measuring gap and position the measuring gap away from said spindle by said known length of said second measuring standard.

23. The outside micrometer of claim 22 wherein both said sleeves are tubular and have an interior opening therethrough to receive said measuring standards in face-to-face contact with said measuring faces of said anvil and said spindle.

24. The outside micrometer of claim 22 wherein said sleeve is a half cylindrical tube made of magnetic material.

25. The outside micrometer of claim 22 wherein said first and second measuring standards are selected from a plurality of measuring standards of different lengths.

26. An outside caliper with accessories, comprising:

a caliper having a first measuring surface in a fixed position and a second measuring surface which is movable with respect to said first measuring surface and means connected thereto for indicating the distance between said first and second measuring surfaces;

a first cylindrical measuring standard having opposite faces thereon of known distance therebetween;

a first clamp for mountably retaining one face of said first cylindrical measuring standard against said first measuring surface;

a second cylindrical measuring standard having opposite faces thereon of known distance therebetween;

a second clamp for mountably retaining one face of said second cylindrical measuring standard against said second measuring surface so as to create a measuring gap between said measuring standard and the other measuring surface so that the measuring gap can be selected in both size and position, said first and second cylindrical measuring standards being selected from a group of cylindrical measuring standards having different lengths between their faces.

27. The micrometer caliper and accessory of claim 26 wherein said mounting means for holding said measuring standard comprises a clamp for engaging the finger of said caliper and for receiving a portion of said measuring standard, including a cylindrical opening in said clamp for receiving the end of a cylindrical measuring standard so that the face of the cylindrical measuring standard can engage against said measuring surface of said caliper so that standard cylindrical measuring standards can be employed.

28. The caliper and accessory of claim 27 wherein said tubular sleeve is made of magnetic material.

* * * * *